(12) United States Patent
Cook

(10) Patent No.: US 6,454,190 B1
(45) Date of Patent: Sep. 24, 2002

(54) WATER MIST COOLING SYSTEM

(75) Inventor: James E. Cook, Anoka, MN (US)

(73) Assignee: Pumptec Inc., Anoka, MN (US)

( * ) Notice: Subject to any disclaimer, the term of this patent is extended or adjusted under 35 U.S.C. 154(b) by 0 days.

(21) Appl. No.: 09/664,683

(22) Filed: Sep. 19, 2000

(51) Int. Cl.$^7$ .................................................. B05B 1/14
(52) U.S. Cl. ..................... 239/553; 239/553.5; 239/562
(58) Field of Search ................................ 239/548, 550, 239/553, 553.5, 557, 562, 566; 169/5, 13, 16

(56) References Cited

U.S. PATENT DOCUMENTS

| | | | | |
|---|---|---|---|---|
| 2,083,002 A | * | 6/1937 | Branche et al. | |
| 4,039,144 A | * | 8/1977 | Mee | |
| 4,808,303 A | * | 2/1989 | Edwards et al. | ............ 210/138 |
| 5,333,660 A | * | 8/1994 | Kohlmann et al. | ......... 141/263 |
| 5,413,128 A | * | 5/1995 | Butts | .......................... 134/56 R |
| 5,587,089 A | * | 12/1996 | Vogel et al. | ................. 210/164 |
| 5,601,688 A | * | 2/1997 | Assaf et al. | ................... 159/44 |
| 5,817,231 A | * | 10/1998 | Souza | ......................... 210/96.2 |
| 5,881,913 A | * | 3/1999 | Boulter | ....................... 222/182 |
| 5,961,047 A | * | 10/1999 | Kleinberger | ................. 239/548 |

* cited by examiner

Primary Examiner—Lesley D. Morris
Assistant Examiner—Dinh Q. Nguyen
(74) Attorney, Agent, or Firm—Roger W. Jensen

(57) ABSTRACT

A water mist cooling system including a reverse osmosis apparatus for producing pure water at an outlet. A plurality of misting nozzles are serially connected by hollow tubing means to form a line having two ends. A pump has an inlet connected to the outlet of the reverse osmosis apparatus, and an outlet connected to a first of two ends of a line of nozzles. The pump is controlled whereby pure water is pumped by the pump at a preselected pressure through said hollow tubing means to the misting nozzles and thence exiting the nozzles as pure water mist to the atmosphere.

2 Claims, 2 Drawing Sheets

WATER MIST COOLING SYSTEM

BACKGROUND AND FIELD OF THE INVENTION

The present invention relates to a water mist cooling system having significant advantages over prior art water mist cooling systems.

Water mist cooling systems have been in use for a number of years, and are especially used in areas having a hot, dry climate, e.g., the southwestern United States. Water mist cooling systems are also used in hot, humid areas where such systems are installed on fans to aid evaporation.

Mist cooling or flash evaporative cooling (FEC) is a rapidly growing market. There are a large number of suppliers to this industry, and ease of entry into the business is one of the reasons for said large number of suppliers. Unfortunately (for the customers/users of such systems) the prior art systems have a serious shortcoming, i.e., short duration of effective cooling followed by a requirement for maintenance and repair, as will be explained below. A typical prior art system of the type presently being offered by such suppliers is illustrated in FIG. 1, where tap water flows through an optional pre-filter (for removing suspended solids in the tap water) and thence, optionally, to a pump and a regulator R, and thence to a series of nozzles N connected serially together.

Some of the prior art systems merely operate with tap water pressure, i.e., eliminating the illustrated pump and regulator; these systems are especially unsatisfactory, since tap water pressure is typically relatively low. One problem with tap water pressure type systems is that the relatively low pressure means large droplet size. Instead of evaporating, the large droplets provide a shower effect below the nozzles. Even the systems using a pump, so as to operate at a higher water pressure, are not satisfactory as will be explained.

As indicated above, misting is used in hot, dry areas, and water quality in such arid regions is almost always very poor, i.e., the water has a very high level of total dissolved solids (TDS), usually expressed in parts per million (PPM). The nozzle orifices are very small, e.g., 0.001" to 010". Thus, when such prior art systems are used, the high mineral content of the water in the arid regions very rapidly clogs the small misting nozzles. To further explain the problem, during periods of non-use, the high mineral content water leaves a scale similar to that left in a coffee pot. The scale breaks off and becomes the sand which clogs the nozzles. Clogged nozzles have a dual negative effect. First, they do not mist, or mist improperly; and second, by not flowing, they cause excessive backpressure to the pumping system, causing premature pumping system failure. Thus, clogged nozzles disable the entire mist cooling system. Another serious problem is the pumps and pumping systems pumping the poor quality water have dramatically shorter lives; the dissolved solids and chlorine in the tap water attack moving and non-moving pump parts.

SUMMARY OF THE INVENTION

The present invention provides a mist cooling system wherein the tap water is first processed by a reverse osmosis apparatus to produce pure water, the output of which is connected to a pump which is adapted, when actuated, to pump pure water from outlet means thereof at a preselected pressure. The system further comprises a plurality of misting nozzles serially connected by hollow tubing means to form a line having two ends, the first of said two ends being connected to said outlet means of said pump, whereby pure water is pumped by said pump through said hollow tubing means to said misting nozzles and thence through said nozzles to the atmosphere. The pump is controlled whereby pure water is pumped by said pump at a preselected pressure through said hollow tubing means to said misting nozzles and thence exiting said nozzles as pure water mist to the atmosphere to provide the cooling.

Applicant's reverse osmosis type pure mist cooling system solves the most objectionable problems with current technology misting systems. More specifically, because of the solvent nature of pure water, the system is continuously cleaned and flushed of impurities. The nozzles do not plug up; instead, the pure water keeps the orifices at the proper factory specification. Not only does the pure water eliminate maintenance of the system, it also dramatically extends the life of the pumping system. No longer do pumps become ruined or disabled by bad water attacking the moving and non-moving parts. Another advantage of the invention is that the pure water misting will not cause "water spots" on mirrors or other flat shiny surfaces; this advantage is applicable to misting systems used, for example, in the produce department of a food market.

In a preferred embodiment of the invention, a water pressure regulator is located at the very end of the tubing; this arrangement has advantages separate and distinct from the use of the reverse osmosis pure water, and is the subject matter of a co-pending application of the applicant.

DETAILED DESCRIPTION OF THE INVENTION

Figure 1:
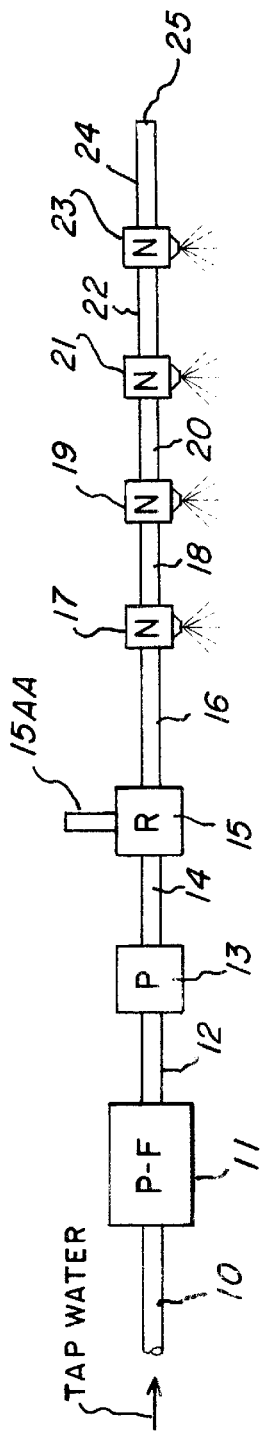
FIG. 1 shows a prior art water mist cooling system.

Referring to FIG. 1, the prior art water mist cooling system is shown to include a number of serially connected components, i.e., pre filter 11, pump 13, regulator 15, and nozzles 17, 19, 21, and 23, connected serially together by pipes or tubing 10, 12, 14, 16, 18, 20, 22, and 24, respectively. Tap water is introduced into tubing 10, passes through an optional pre filter 11 and is pumped by pump 13 to or past the regulator 15 to the serially connected nozzles as shown. The regulator 15 is of conventional design, and a bypass 15AA prevents system overpressure in the manner well known to those skilled in the art. The end of the tube 24 is closed off as at 25.

Figure 2:
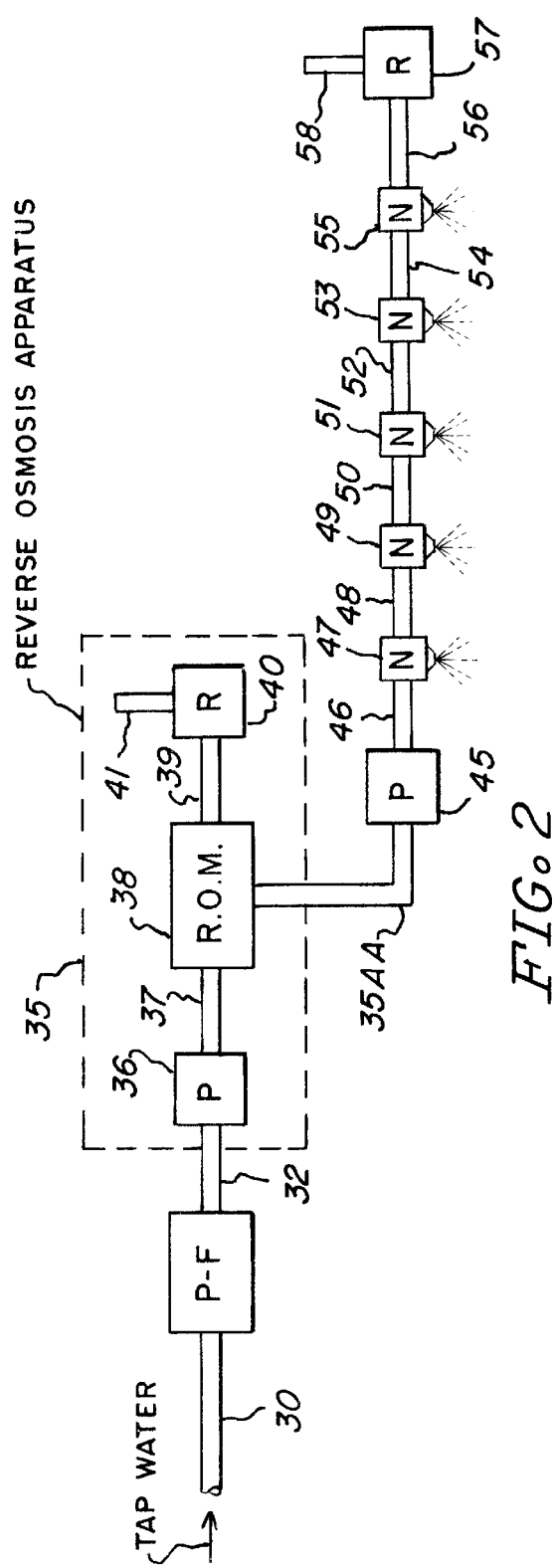
FIG. 2 show the applicant's reverse osmosis type water mist cooling system in schematic form.

The present invention is depicted in its preferred embodiment in FIG. 2, wherein tap water is conducted through tubing 30 to a pre filter 31, the output of which is connected by 32 to the intake of a pump 36 associated with a reverse osmosis unit 35. The pump 36 pumps the filtered tap water to the reverse osmosis membrane 38 and has a connection 39 to a regulator 40 which may be of the type shown in FIG. 3, and having a bypass 41. The output from the reverse osmosis unit 35 is pure water, which flows through a pipe or tubing 35AA which is then connected to the inlet of an appropriate pump 45, the output of which is connected to a plurality of misting nozzles serially connected by hollow tubing means to form a line having two ends; the first of the two ends being connected to the outlet means of pump 45. More specifically, the plurality of misting nozzles are serially identified by reference numerals 47, 49, 51, 53 and, 55. The hollow tubing means connecting said nozzles are respectively identified by reference numerals 46, 48, 50, 52, and 54. Tubing 46, as depicted, may be considered the outlet means of the pump 45.

An alternate arrangement for the reverse osmosis apparatus would be for the pure water produced by unit 35 to be stored in a holding tank (not shown) and provided, as required, to the input of pump 45. A boost pump (not shown) could, optionally, be used to transfer the pure water from the holding tank to pump 45.

The pre filter 31, as well as the reverse osmosis apparatus 35 and pumps 45 and 36, are readily commercially available. One pump that may be used is manufactured by Pumptec, Inc. of Anoka, Minn.; the type shown in applicant's U.S. Pat. No. 5,173,039.

Thus, the basic system as above described provides the above-described extremely important advantages over the prior art system. To clarify, the reverse osmosis apparatus 35 has the function of converting tap water into pure water, so that only pure water is pumped by pump 45, thence exiting the nozzles as pure water mist to the atmosphere. The pure water misting cooling system of FIG. 2 avoids the prior art systems problems. The nozzles 47–55 do not clog, and the pump 45, and the pumping system, is protected against premature failure; these are extremely important advantages.

FIG. 2 also depicts a water pressure regulator 57 connected at the end of the line of nozzles by tubing 56, the regulator 57 having a bypass 58. It should be understood that use of the regulator 57 positioned as shown in FIG. 2 is not mandatory for the thrust of the invention of this application. However, it is a useful and advantageous addition to the present invention, and hence has been shown in FIG. 2. The positioning of the regulator 57 at the end of a line of misting nozzles is the subject matter of the applicant's co-pending application, Ser. No. 09/664,683, filed Sep. 19, 2001.

Figure 3:
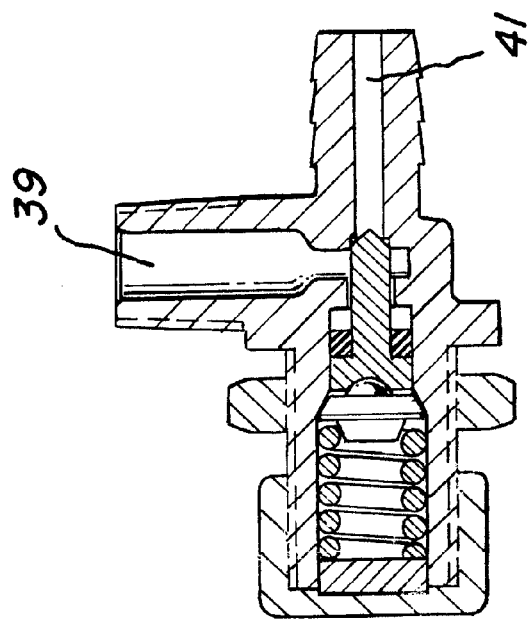
FIG. 3 is a view in cross section of a water pressure regulator.

FIG. 3 shows a regulator which may be used for elements 40 and 57 as shown in FIG. 2. Regulators of this type are readily available in the commercial market. On FIG. 3, reference numerals 39 and 41 have been used to identify the portions thereof which correspond to the regulator 40 shown in FIG. 2.

Figure 4:
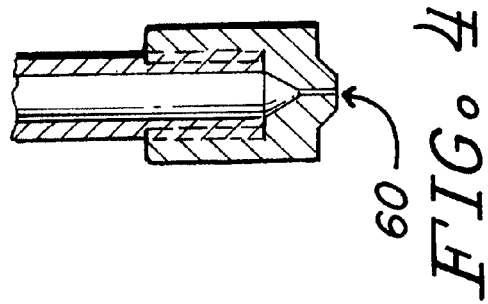
FIG. 4 is a cross sectional view of a nozzle.

FIG. 4, depicting a cross section of a nozzle of the type commercially available and having, as indicated above, a very small orifice 60 which must be very small in diameter in order to provide optimum misting function. As indicated, the orifice ranges between 0.001" and 0.010".

In misting systems, the $H_2O$ or water molecules evaporate. Minerals, e.g., calcium, do not evaporate and are left behind to form fine sand which plugs nozzles. This would be the case of the prior art system shown in FIG. 1. Using pure water as provided by the present invention, the exact opposite occurs. Because of the solvent nature of pure water, the system is continuously cleaned and flushed of impurities.

The prior art system of FIG. 1 requires a high level of expensive maintenance for the replacement of nozzles. Also, the high mineral content water, as well as the chlorine in tap water, tends to dramatically shorten the lives of the pump units used with such systems. To explain, the seal and valve systems of typical pumps are damaged by the dissolved mineral forming abrasive "sand" as the $H_2O$ evaporates from the system. High pressure pumps have little or no tolerance for granular contamination. The applicant's reverse osmosis pure water system eliminates maintenance of the basic system, i.e., the nozzles do not get plugged up, and applicant's system also dramatically extends the life of the pumping system; no longer do pumps get ruined by bad water attacking the moving and non moving parts of the pump.

While the preferred embodiment of the invention has been illustrated, it will be understood that variations may be made by those skilled in the art without departing from the inventive concept. Accordingly, the invention is to be limited only by the scope of the following claims.

I claim:

1. A flash evaporative cooling system comprising:

a) a reverse osmosis apparatus for receiving untreated water under a preselected pressure, for applying said untreated water to a membrane, and for producing pure water at an outlet;

b) a pump connected to said outlet and adapted, when actuated, to pump pure water from outlet means thereof; and c) a plurality of misting nozzles serially connected by hollow tubing means to form a line having two ends, a first of said two ends being connected to said outlet means of said pump, and said pump being controlled whereby pure water is pumped by said pump at a preselected pressure through said hollow tubing means to said misting nozzles and thence exiting said nozzles as pure water mist to the atmosphere, to provide flash evaporative cooling.

2. The system of claim 1, further characterized by having water pressure regulator means connected at the other of said ends of said line of misting nozzles.

\* \* \* \* \*